United States Patent Office 3,752,772
Patented Aug. 14, 1973

3,752,772
PREPARATION OF CATALYST FROM KAOLIN CLAY
John P. Horzepa, Edison, N.J., assignor to Engeland Minerals & Chemicals Corporation, Woodbridge, N.J.
No Drawing. Filed June 25, 1971, Ser. No. 157,019
Int. Cl. B01j 11/40, 11/44
U.S. Cl. 252—448                              6 Claims

ABSTRACT OF THE DISCLOSURE

A mixure of hydrated kaolin clay and calcined kaolin clay (metakaolin form) or partially rehydrated metakaolin is formed into particles such as extruded pellets. The particles are calcined at about 1350° F. to convert the hydrated clay into metakaolin. The particles are then immersed in water and heated under superatmospheric pressure to provide a cracking catalyst.

BACKGROUND OF THE INVENTION

Kaolin clay is a naturally-occurring mineral material composed for the most part of kaolinite or similar platy crystalline minerals of the approximate formula $$Al_2O_3.2SiO_2.2H_2O$$

Even in highly pure form the clay does not possess sufficient activity for use as a cracking catalyst and it is not sufficiently porous for use as a catalyst carrier. Reference is made to relevant data in U.S. 2,967,157 to Robinson and Weir. Calcination to remove water of crystallization does not impart the required properties to such clay.

Prior to my invention it has been considered necessary to employ an acid treatment of one type or another in order to impart sufficient catalytic activity to kaolin clay.

A commercially successful method for activating kaolin clay involves an acid-activation step using sulfuric acid. The general method is described in U.S. 2,967,157 to Robinson and Weir. A preferred embodiment for providing pelleted catalysts is set forth in U.S. 3,033,798 to Weir and Robinson.

Acid-activated kaolin catalysts obtained by the procedures described in the aforementioned patents possess satisfactory cracking properties which are retained to a satisfactory degree after the catalysts are subjected to elevated temperatures. The catalysts have outstanding hardness (resistance to attrition) but they tend to become less resistant to attrition after they have been subjected to high temperature air or steam during regeneration and/or use.

PRIOR ART

U.S. 2,477,664 to Shabaker is also concerned with the activation of kaolin clay and teaches that kaolin catalysts which retain their activity when subjected to steam at high temperature may be obtained by extruding raw (hydrated) kaolin clay and water to form pellets, calcining the pellets and subjecting the pellets to the action of high pressure steam before using the catalyst in a cracking unit. This patent discloses that catalysts of optimum activity retained upon steaming require an acid treatment which may be carried out prior to calcination and steaming or subsequent to calcination and steaming. The patent includes catalytic cracking data for catalyst obtained by calcining extruded pellets of raw (hydrated) kaolin clay, steaming for 10 hours at 450° F. (500 p.s.i.) and activating in air at 1050° F. without any acid treatment. The data show that such catalyst was not appreciably more active than pellets of the raw clay were after such pellets had merely been calcined.

THE INVENTION

An object of the invention is to provide means for improving properties of a pelleted catalytic product obtained by the general procedure described in U.S. 2,477,664 to Shabaker.

A specific object is to improve the catalytic cracking properties of the product by simple modification of such procedure.

Another object is to increase the surface area of the product obtained by such procedure.

An object is to achieve the foregoing objectives without the necessity for using acid treatment.

Stated briefly, the method of the present invention comprises the incorporation with hydrated (raw) kaolin clay of one or more aluminum silicate materials selected from the group consisting of calcined kaolin clay (metakaolin form) and partially rehydrated metakaolin (defined hereinafter) prior to forming a mixture of the clay materials into shaped particles, such as extruded pellets, calcining the particles, heating the particles in the presence of liquid water under superatmospheric pressure and recovering the solid particles from the water.

Thus, the essence of the invention involves the substitution of a portion of the hydrated kaolin clay with specific kaolin-derived aluminum silicates in a prior art process for making a clay catalyst. The substitution of either one or both of the aforementioned aluminum silicates for a portion of the hydrated clay in the precursor particles leads to the provision of products having catalytic cracking properties superior to those obtained by following the teachings of the prior art. Furthermore, the products obtained by the method of the invention have higher surface areas and are therefore more useful as carriers for catalytic material subsequently impregnated thereon.

In an embodiment of the invention, the duration of the high pressure steaming step is controlled in order to prevent loss of particle hardness which would result from excessive exposure to high temperature steam.

DESCRIPTION

The term "kaolin clay" as used herein refers to clay containing one of the following minerals as the predominating mineral species: kaolinite, nacrite, dickite, anauxite, halloysite. These minerals may be represented by the formula $Al_2O_3.2SiO_2.xH_2O$ wherein $x$ is 2 except in the case of certain halloysites, in which case $x$ is 4. A high purity kaolin clay is preferred. Such clay should be low in iron, i.e., it should analyze less than 1 percent $Fe_2O_3$.

I prefer to degrit the raw clay as mined by removing particles larger than 325 mesh (Tyler) and, preferably, I remove plus 10 micron (equivalent spherical diameter) particles by wet or dry classification methods. Fine or coarse size fractions of kaolin clay are suitable.

Metakaolin is a specific form of calcined clay. Conditions suitable for converting kaolin clay to metakaolin are set forth in U.S. 3,224,892 to Hemstock et al. The preparation of partially rehydrated metakaolin is also described in detail in this patent and reference is made herein to details supplied in said patent. The partially rehydrated metakaolin I employ may contain from about 7 percent to 12.5 percent loss on ignition. The term "loss on ignition" (L.O.I.) is identical to the term "water of crystallization" as defined in the patent to Hemstock et al.

The metakaolin and partially rehydrated metakaolin should be employed in finely divided form, i.e., particles finer than 325 mesh. Preferably the particles should be finer than about 20 microns.

The ratio (wt.) of kaolin-derived aluminum silicate modifier (i.e., metakaolin or partially rehydrated metakaolin) to hydrated kaolin clay is generally within the range of 1:10 to 10:1 (calculated on a moisture-free weight basis). When the proportion of metakaolin or partially rehydrated metakaolin approaches that represented by the maximum ratio, difficulty may be experienced in producing hard shaped particles such as extruded pellets. On the other hand, when the ratio approaches the minimum, the surface areas and catalytic cracking activity may be lower than desired. Especially recommended is the use of a ratio of metakaolin or partially rehydrated metakaolin to hydrated clay within the range of about 1:3 to 3:1.

The selection of partially rehydrated metakaolin an the substitute for a portion of the hydrated kaolin clay generally results in products having higher surface areas and catalytic cracking activities than products obtained employing metakaolin as the substitute. However, the latter is less expensive and for this reason it may be preferred. Blends of partially rehydrated metakaolin and metakaolin in any proportions—e.g., 0:100 to 100:0 (wt.) may be employed is the substitute for a portion of the hydrated clay.

In order to form the mixture of hydrated kaolin clay and metakaolin or partially rehydrated metakaolin into particles of a size and shape suitable for use as a catalyst or catalyst carrier, water is incorporated with the solids. The amount of water employed varies with the forming method which is to be employed.

When the particles are produced by extrusion, the amount of water that is employed must be sufficient to form a plastic mass amenable to this forming method. The amount of water required to realize this condition will vary with the proportions of hydrated kaolin clay and metakaolin or partially rehydrated metakaolin. Furthermore, it will vary, depending upon whether metakaolin or partially rehydrated metakaolin is utilized. The latter aluminum silicate has a higher water demand than metakaolin. Furthermore, fine hydrated kaolin clay may require more water than coarser koalin clay from the same crude. For example, a total clay/water ratio of 2.4/1 may suffice to produce an extrudable mixture with a blend of 2 parts by weight hydrated clay to 1 part by weight partially rehydrated metakaolin. When the same proportion of metakaolin is substituted for the partially rehydrated metakaolin, a total clay/water ratio of 2.0/1 may be more suitable.

To produce the catalyst composition in the form of microspheres, the mixture of clay materials may be slurried at about 40 percent to 60 percent solids in water which preferably contains a dispersant such as tetrasodium pyrophosphate. The use of dispersant in amount within the range of about 0.2 percent of 0.6 percent of the weight of clay is recommended. The slurry is spray dried in conventional manner to produce microspheres (typically finer than 20 mesh (Tyler) and larger than 20 microns).

The formed particles are calcined in air at a temperature within the range of about 940° F. to 1650° F. for a time sufficient to convert all of the hydrated kaolin clay in the particles into metakaolin (defined in U.S. 3,224,892 to Hemstock and Bergmann). The time required depends upon the temperature that is employed and is usually within the range of ½ hour to 25 hours. A calcination temperature of 1350° F. and a time within the range of 2 to 10 hours is especially recommended.

After they have been calcined, the particles are essentially anhydrous (i.e., they analyze less than 1 percent L.O.I). The term "L.O.I." as used herein refers to loss on ignition and is determined by heating the particles to constant weight at 1800° F., the particles having previously been dried to constant weight at 225° F. to eliminate so-called "free moisture." Provided calcination is well-controlled and uniform, the particles should be essentially noncrystalline (as determined by X-ray diffraction). Kaolinite peaks may be present in any undercalcined particles and high temperature crystalline phases may be present in any overcalcined portions.

The particles are cooled to ambient temperature after the calcination treatment and then they are immersed in water to produce a suspension which may contain, for example, 5 percent to 25 percent solids.

The suspension is placed in autoclave or other equipment serving a similar function.

The particles should be steamed at high pressure until they have a B.E.T. surface area above 100 m.²/g. Generally it will be necessary to rehydrate to a L.O.I. in excess of 7 percent to achieve this result. However, when portions of the particles have been overcalcined or undercalcined, the L.O.I. may be lower than this figure. Excessive rehydration is to be avoided. When the particles are steamed under superatmospheric pressure for too long a time, they tend to soften. This softening may be attributable to recrystallization (or incipient recrystallization) of kaolinate (or other kaolin mineral). Thus, when the duration of hydrothermal treatment is sufficient to provide particles having a L.O.I. above 12.5 percent, the microspheres may lack the desired hardness.

Saturated steam at pressures of about 200 to 1000 p.s.i.g. may be used.

As pressure increases the duration of hydrothermal treatment will decrease. However, more expensive equipment may be required. A pressure of about 500 p.s.i.g. is especially suitable since hydrothermal treatment is sufficiently short (e.g., 4 hours in a batch operation) and expenses involved in dealing with higher pressures are avoided.

After hydrothermal treatment, the suspension is cooled and water is removed from the particles by suitable means, e.g., by filtration and/or drying.

At this point of the process the particles have essentially the same chemical analysis as the starting kaolin clay with the exception that the combined water content is lower. Thus, the L.O.I. of kaolin clay is normally within the range of about 13.5 percent to 14.0 percent while the particles usually have an L.O.I. above 7 percent and below 12.5 percent after high pressure steam treatment.

The steamed particles may be added in hydrated form to a cracking unit to crack gas-oil feedstock. Preferably, the particles are subjected to a heat treatment before they are used in a cracking unit. This heat treatment may be carried out in air and/or steam at a temperature above the temperature encountered in a cracking unit. A calcination and/or steam treatment within the range of 1000° F. to 1500° F. is recommended.

It is within the scope of the invention to employ the particles obtained by the process of the invention as adsorptive carriers for other catalytic material. For example, the particles may be impregnated with a salt containing a volatile anion and a cation which forms a nonvolatile oxide having catalytic properties, e.g., copper nitrate, which is used to prepare a supported copper oxide catalyst. The impregnated particles are calcined to decompose such salt, leaving the desired metallic oxide adsorbed in the particles. In similar manner, the particles may be impregnated with a solution of salt or other compound capable of decomposing in a reducing atmosphere to leave a metallic residue.

The "CAT-D" test used in the examples which follow is described by Clifford A. Harriz in "To Test Catalytic Cracking Activity," Hydrocarbon Processing, October 1966, vol. 45, No. 10, pages 183 to 188. Cracking was carried out at 900° F. with 10 percent steam and a liquid hourly space rate of 1.0 (ml. oil)/(cc. catalyst) (per hour) for a 15 minute operation period.

The term "kaolin coke factor" used in presenting catalytic data refers to a value obtained by comparing coke made of the experimental catalyst with that of a commercial kaolin catalyst at the same conversion (extrapolated).

The ball mill hardness testing procedure is described in U.S. 3,367,887 to Haden and Dzierzanowski.

The hydrated kaolin clay material employed in the illustrative examples is supplied to the trade under the name "Min-Chem Special." Typical properties of this clay are described in U.S. 3,367,887 (supra).

The metakaolin employed is supplied under the trade name "Satintone No. 2." Typical properties are also described in U.S. 3,367,887.

The partially rehydrated metakaolin was prepared by slurrying the metakaolin in water at about 20 percent solids, partially filling an autoclave with the slurry, and heating the slurry at a saturated steam pressure of 500 p.s.i.g. for 4 hours. The slurry was cooled, dewatered by filtration, dried and pulverized. L.O.I. was 10.48 percent. Surface area (B.E.T. method) was 136 m.$^2$/g. (The method for determining B.E.T. surface area is described in U.S. 3,224,892.)

EXAMPLE I

This example illustrates the advantage of blending partially rehydrated metakaolin with hydrated kaolin clay when preparing a pelleted cracking catalyst by extruding clay material with water to form pellets, calcining the pellets and subjecting the pellets to high temperature steam.

(A) Control—Use of hydrated clay alone

The hydrated clay was mixed with water in a 3.24/1 weight ratio. The mixture was mulled to mix the ingredients and the mixture was extruded in an auger-type extruder under vacuum to produce cylindrical pellets about 0.17" diameter and 0.17" long.

The pellets were calcined in a muffle furnace at 1350° F. for 24 hours. After they had cooled to room temperature, the pellets were mixed with water in a 1:3.4 weight ratio and the mixture was heated in an autoclave at 500 p.s.i.g. for 4 hours.

The water was drained from the pellets and they were dried overnight at 250° F.

Portions of the dried pellets were calcined at 1350° F. CAT-D properties of the calcined pellets are reported in table form. Also reported in this table are the B.E.T. surface areas, L.O.I. and bulk density of the pellets after various points in the processing.

(B) and (C) Experimental catalysts—Partially rehydrated metakaolin substituted for portions of the hydrated kaolin (B) The procedure of part (A) was repeated employing 1 part by weight of the partially rehydrated metakaolin with 2 parts by weight hydrated clay, whereby the clay mixture contained ⅓ partially rehydrated metakaolin. To extrude this mixture a total clay-water ratio of 2.39/1 was used.

(C) In another test the ratio of partially rehydrated metakaolin to hydrated clay was increased to a 2/1 ratio, whereby the partially rehydrated metakaolin accounted for 66⅔ percent of the clay weight. The clay-water ratio required to extrude this mixture was 1.81/1.

After these mixtures were extruded, the resulting pellets were processed and tested as described in part (A) of this example. The results are summarized in the table.

Data in the table show that the surface area of the pelleted catalyst product was increased by substituting a portion of the hydrated kaolin clay with partially rehydrated metakaolin. Thus, substitution of ⅓ of the hydrated metakaolin effected an increase of over 50 percent. The higher surface area was retained after calcination. The water replaced during high pressure steaming was also increased by such substitution.

Bulk density data in the table show that substitution of the partially rehydrated metakaolin reduced the bulk density of the pelleted catalyst product. Hardness was not adversely affected until there was ⅔ substitution; however, this catalyst was still of acceptable hardness.

CAT-D data in the table show that as the percentage of partially rehydrated metakaolin in the starting pellets was increased, the pelleted products yielded more gasoline and operated at higher conversion levels.

EFFECT OF SUBSTITUTING PARTIALLY REHYDRATED METAKAOLIN FOR HYDRATED KAOLIN CLAY IN PELLETS USED TO PREPARE CATALYST BY CALCINATION AND HIGH PRESSURE STEAMING

| | Composition of original pellets, percent partially rehydrated metakaolin substituted for hydrated kaolin | | |
|---|---|---|---|
| | A, 0 | B, 33⅓ | C, 66⅔ |
| Properties of pellets after calcination 1,350° F./24 hrs. and steaming 500 p.s.i.g./4 hr.: | | | |
| L.O.I., wt. percent | 6.6 | | |
| Surface area, m.$^2$/g | 89.1 | 147 | |
| Calcination, 1,350° F., steaming, 500 p.s.i.g. and calcination 1,350° F./4 hr.: | | | |
| L.O.I., wt. percent | 1.90 | | 1.53 |
| Surface area, m.$^2$/g | 69.5 | 128 | 147 |
| Bulk density | 0.905 | 0.764 | 0.781 |
| Hardness (4 ball): | | | |
| After 1 hour | 97.6 | 98.8 | 97.6 |
| After 6 hours | 92.7 | 90.8 | 88.8 |
| CAT-D properties: | | | |
| Gasoline, vol. percent | 15.9 | 26.4 | 30.3 |
| Coke, wt. percent | 3.12 | 4.03 | 5.47 |
| Gas, wt. percent | 8.2 | 10.6 | 15.9 |
| Conversion, wt. percent | 24.8 | 36.6 | 46.8 |
| Gas gravity (air=1.0) | 1.33 | 1.39 | 1.42 |
| Cracking efficiency (wt./wt.) | 54.4 | 60.1 | 54.3 |
| Kaolin coke factor | | 2.53 | 2.10 |

EXAMPLE II

Example I, part (B) was repeated substituting "Satintone No. 2" ® (metakaolin) for the partially rehydrated metakaolin. The ratio of "Satintone No. 2" to "Min-Chem Special" was ⅓. Water/clay ratio was 2.39/1. The mixture of clays was mulled with water and extruded under vacuum to form pellets. The pellets were calcined in air at 1350° F. overnight, cooled and heated with saturated steam (500 p.s.i.g. for 4 hours), as described in detail under Example I, part (A).

After steam treatment, the L.O.I. of the pellets was 7.60 percent and surface area was 113.6 m.$^2$/g. A comparison of these results with those obtained in Example I, part (A) showed that when metakaolin was present in the original mixture, the hydrated product contained more water of crystallization and had a higher surface area.

After the pellets obtained from the mixture of hydrated kaolin clay and metakaolin had been calcined in air at 1350° F. for 4 hours, L.O.I. was 1.48 percent and surface area was 97.2 m.$^2$/g.

The substitution of ⅓ of the hydrated clay by metakaolin resulted in a decrease of bulk density in the calcined pellets. Without metakaolin bulk density was 0.905. With metakaolin substituted for ⅓ of the hydrated kaolin, density was 0.787 g./cc.

Hardness of the calcined pellets obtained from the mixture of clays was 95.8 percent after 1 hour and 87.0 percent after 6 hours.

The results of CAT-D tests showed that by substituting ⅓ of the hydrated kaolin with metakaolin, gasoline yield was increased to 18.9 percent and conversion was increased to 29.0 percent. A comparison of these results with those obtained when the same quantity of partially rehydrated metakaolin was substituted for the hydrated kaolin clay (Example II(B)) demonstrates that partially rehydrated metakaolin is more effective than metakaolin as a substitute for a proportion of the hydrated clay in improving the catalytic cracking properties of a catalyst obtained by calcining pelleted hydrated clay and partially rehydrating the calcined pellets by means of high pressure steam. However, substitution of metakaolin for a portion of the hydrated kaolin improved cracking properties.

I claim:

1. In a method for making a catalyst wherein a mixture of hydrated kaolin clay and water is formed into particles of a size and form suitable for use as a catalyst, the particles are calcined under conditions which dehydrate said clay and convert it into metakaolin, and the calcined particles are heated in the presence of liquid water under superatomspheric pressure, the improvement which comprises substituting a portion of said hydrated clay in said particles with a clay-derived aluminum silicate from the group consisting of metakaolin and partially rehydrated metakaolin.

2. The method of claim 1 wherein the ratio of hydrated kaolin to said clay-derived aluminum silicate is within the range of 1:10 to 10:1.

3. The method of claim 2 wherein the ratio is within the range of 1:3 to 3:1.

4. The method of claim 1 wherein said clay-derived aluminum silicate is partially rehydrated metakaolin which has a B.E.T. surface area in excess of 100 m.$^2$/g.

5. The method of claim 4 wherein the ratio of partially rehydrated metakaolin to hydrated kaolin clay is within the range of 1:3 to 3:1.

6. The method of claim 1 wherein the particles are formed into pellets by extrusion.

References Cited
UNITED STATES PATENTS

| | | | |
|---|---|---|---|
| 3,226,252 | 12/1965 | Hemstock | 252—450 X |
| 3,039,973 | 6/1962 | Robinson et al. | 252—450 |

CARL F. DEES, Primary Examiner

U.S. Cl. X.R.

252—455 R